United States Patent
Andersson et al.

(10) Patent No.: US 8,661,933 B2
(45) Date of Patent: Mar. 4, 2014

(54) VEHICLE BRAKE PEDAL CRASH SAFETY DEVICE

(75) Inventors: John-Erik Andersson, Stenungsund (SE); Björn Roger Löfving, Gothenburg (SE)

(73) Assignee: Volvo Car Corporation (SE)

( * ) Notice: Subject to any disclaimer, the term of this patent is extended or adjusted under 35 U.S.C. 154(b) by 949 days.

(21) Appl. No.: 12/190,529

(22) Filed: Aug. 12, 2008

(65) Prior Publication Data

US 2010/0037725 A1 Feb. 18, 2010

(51) Int. Cl.
*B60R 21/09* (2006.01)
*B60T 7/06* (2006.01)

(52) U.S. Cl.
USPC ............................................. 74/512; 180/274

(58) Field of Classification Search
USPC .................... 74/512, 513, 560; 180/274, 275
See application file for complete search history.

(56) References Cited

U.S. PATENT DOCUMENTS

| | | | | |
|---|---|---|---|---|
| 5,477,746 A | * | 12/1995 | Perisho et al. ................... | 74/512 |
| 6,070,488 A | * | 6/2000 | Yabusaki et al. ................ | 74/512 |
| 6,089,342 A | * | 7/2000 | Muller et al. ................. | 180/274 |
| 6,655,489 B2 | * | 12/2003 | Kawai et al. ................... | 180/274 |
| 7,111,703 B2 | * | 9/2006 | Endo et al. ..................... | 180/274 |
| 7,398,708 B2 | * | 7/2008 | Harashima et al. ............. | 74/512 |
| 7,568,545 B2 | * | 8/2009 | Tanigawa et al. ............. | 180/274 |
| 7,690,279 B2 | * | 4/2010 | Himetani ......................... | 74/512 |
| 7,775,555 B2 | * | 8/2010 | Allen et al. .................... | 280/748 |

FOREIGN PATENT DOCUMENTS

| | | |
|---|---|---|
| EP | 1074445 | 2/2001 |
| EP | 1440859 A1 | 7/2004 |
| EP | 1557330 | 7/2005 |
| WO | WO 02/051669 | 7/2002 |

* cited by examiner

*Primary Examiner* — Thomas Diaz
(74) *Attorney, Agent, or Firm* — Angela M. Brunetti

(57) ABSTRACT

A brake pedal crash safety device for a vehicle in which a brake pedal arm is rotatably mounted to a first vehicle body component and has a first locking element, shaped as a circle-sector and having its geometrical center at a center of movement of the brake pedal arm. A second locking element is mounted to a second vehicle body component. The second locking element is mounted a predetermined distance from the first locking element. The predetermined distance is constant and has a predetermined amount of allowable movement therebetween for a brake pedal arm position. A crash force applied to a front of the vehicle displaces the first vehicle body component toward the second vehicle body component and the predetermined amount of allowable movement between the first and second locking elements will be closed, irrespective of a current pedal position, thereby preventing further rotation of the brake pedal arm through interlocking first and second locking elements.

16 Claims, 3 Drawing Sheets

VEHICLE BRAKE PEDAL CRASH SAFETY DEVICE

TECHNICAL FIELD

The present invention is related to a vehicle brake pedal crash safety device.

BACKGROUND

Motor vehicles demand small outer dimensions, large inner space, strong drive lines and a high level of equipment. The distance of collapse in the engine compartment during a crash is limited because of these demands. During a frontal crash, the front side members are compressed in order to absorb energy and keep the crash pulse low.

It is known that when a motor vehicle is subject to a large force such as a frontal impact, the vehicle structure and components are often displaced or deformed into the occupant area. This is potentially dangerous as it may result in injuries to the driver and passengers.

In general, vehicles, such as a motor vehicle, are equipped with a suspended brake pedal. This brake pedal is suspended on a dash panel by a pedal bracket. The dash panel is partitioning the vehicle into an engine compartment or room in front of the vehicle and a passenger compartment. The brake pedal is normally constructed such that it extends to the rear of the vehicle.

Further, the instrument panel is a vehicle body component disposed adjacent to an engine in the engine compartment. Therefore, during a frontal collision of the vehicle, the engine can move toward the rear of the vehicle and push the instrument panel into the passenger compartment. This causes the instrument panel to deform and stick-out toward the rear of the vehicle. Consequently, the brake pedal can move toward the rear of the vehicle.

The arms on a brake pedal are very rigid such that an operator can operate the brakes. Likewise, an arm on a clutch pedal is also rigid in order to perform its designated task. Such rigid arm structures are potentially damaging in the event of interaction with a human being at the time of a crash.

In particular, if an operator is using a pedal at the time of a crash, there is a risk that the pedal arm will be pushed rearward by the impact, causing the included angle between the upper surface of a foot of the operator and a leg, to which the foot is attached, to be reduced. This reduction in angle is likely to cause injury to the ankle joint connecting the foot and the leg.

Furthermore, when the front part of the vehicle is deformed, it is common that the driveline hits a brake booster, which is then dislocated rearward in the vehicle. The brake booster is typically attached to the brake pedal arm through a pushrod. If the pushrod is moved rearward equally as much as a center movement of the pedal, the pedal plate for the foot of the driver will move rearward in the same proportion, and will not typically result in injury to the operator. However, if the pushrod moves rearward more than the brake pedal, the pedal plate will move rearward more than the upper part of the brake pedal arm. This movement will usually be geared up at a ratio of approximately four to one. This may occur if the brake booster is dislocated more than the upper part of the pedal box. This may cause injuries to a lower leg of the operator.

Furthermore, if the brake booster is hit mainly at one side, this side might leave a higher intrusion than the other, which may have the consequence that the pedal box and the brake pedal arm will be slanting. This may also cause injuries to a lower leg of an operator.

Some previous attempts to reduce the risk of crash injuries caused by the brake pedal are based on the concept of releasing the brake pedal arm, such that it is not possible to displace it further to the back of an associated vehicle.

One such previous attempt is illustrated in US 2004/0020324, which describes a brake pedal assembly for a motor vehicle in which a pedal lever in the form of a brake pedal is constructed as two separate pieces, a primary lever and a secondary lever pivotally connected by a pivot rod to a deformable part of the body structure of the motor vehicle.

The primary lever is constructed as a 'U' section and envelopes the secondary lever. Both of the levers are attached together by a pivot, positioned below a brake booster pushrod and are clamped together by a latching means or catcher. During a crash event there is an interaction of the top of the catcher and another part of the vehicle structure, such as a cross-car beam, that is deformed at a different rate to the part to which the two levers are attached. If the crash is sufficiently severe to cause the beam to contact the catcher then it causes the catcher to pivot around a pivot rod allowing the primary lever to be released from the catcher. As the pivot of the primary and secondary levers is lower than that of the booster pushrod, the primary lever will rotate away from the lower leg of an operator, whereby, upon release, the angle of the pedal plate with respect to the foot of an operator will change rapidly, which may put unwanted stress on the lower leg and foot of the operator.

SUMMARY

The inventive subject matter is summarized as a brake pedal crash safety device for a vehicle in which a brake pedal arm is rotatably mounted to a first vehicle body component and has a first locking element, shaped as a circle-sector and having its geometrical center at a center of movement of the brake pedal arm. A second locking element is mounted to a second vehicle body component. The second locking element is mounted a predetermined distance from the first locking element. The predetermined distance is constant and has a predetermined amount of allowable movement therebetween for a brake pedal arm position. A crash force applied to a front of the vehicle displaces the first vehicle body component toward the second vehicle body component and the predetermined amount of allowable movement between the first and second locking elements will be closed, irrespective of a current pedal position, thereby preventing further rotation of the brake pedal arm through interlocking first and second locking elements.

Figure 1:
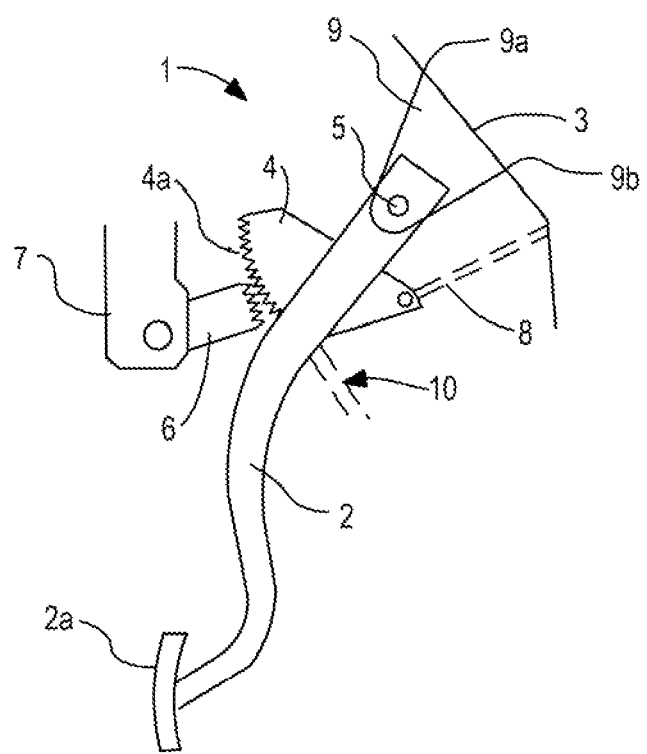
FIG. 1 is an illustration of a vehicle brake pedal crash safety device according to the inventive subject matter in a first pedal arm position.

Still other objects and features of the inventive subject matter will become apparent from the following detailed description considered in conjunction with the accompanying drawings. It is to be understood that the drawings are designed solely for the purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. The same reference numerals will be used for illustrating corresponding features in the different drawings.

DESCRIPTION OF INVENTION

In a first embodiment of the inventive subject matter, as illustrated by FIG. 1, there is shown a vehicle brake pedal crash safety device 1. The device 1 comprises a brake pedal arm 2, which is rotatably mountable to a first vehicle body component 3, such as an instrument panel, front bulkhead or firewall. The first vehicle body component 3 is displaceable toward a rear of an associated vehicle when external force is applied to a front of the vehicle during a crash.

The brake pedal arm 2 is shaped as a normal pedal but equipped with a special crash safety feature through being equipped with a first lockine element 4. The first locking element 4 is shaped as a circle-sector having its geometrical center aligned with yet displaced from a movement center 5 or pivot point, of the brake pedal arm 2. The circle-sector 4 is directed backwards of an associated car, towards an instrument panel (not shown) and its lower cross beam 7. A second locking element 6, resistance console or snubber, is mountable to a second vehicle body component 7, such as a cross-car beam, that is displaceable toward a rear of the associated vehicle at a different rate to the first vehicle body component 3 during a crash.

Both locking elements 4, 6 are mountable such that a distance between a circular arc 4a of the first locking element 4 and the second locking element 6 is constant and provides a predetermined amount of allowable movement 10, or play, therebetween for any allowed brake pedal arm 2 position, i.e. any position allowed during normal operation of the brake pedal, thus if an external crash force is applied to the front of the associated vehicle such that it displaces the first vehicle, body component 3 toward the second vehicle body component 7, the play 10 between the first and second locking elements will be closed irrespective of the current pedal position, thus preventing further rotation of the brake pedal arm 2 and preventing the brake pedal from being pressed rearwards of the associated vehicle at the level of the second locking element through interlocking the first and second locking elements 4,6.

Preferably the circular arc 4a of the first locking element 4 has an aggressive surface, e.g. saw teeth like surface. This surface may be arranged to interlock with the second locking element 6 through the second locking element 6 being provided with at least one sharp, e.g. knife edge like, projection arranged to hit in between two teeth on the circular arc 4a of the first locking element 4, thus interlocking the first and second locking elements 4, 6.

Alternatively, the second locking element 6 may have an aggressive surface, e.g. saw teeth like surface. This surface may be arranged to interlock with the first locking element 4 through the circular arc 4a of the first locking element 4 being provided with a series of sharp, e.g. knife edge like, projections at least one of which is arranged to hit in between two teeth on second locking element 6, thus interlocking the first and second locking elements 4, 6.

In yet another alternative embodiment the circular arc 4a of the first locking element 4 and the corresponding part of the second locking element 6 may both have aggressive surfaces, e.g. saw teeth like surfaces. These surfaces may be arranged to interlock with each other through the teeth thereof being arranged to hit in between each other in a meshing fashion, thus interlocking the first and second locking elements 4, 6.

Figure 2:
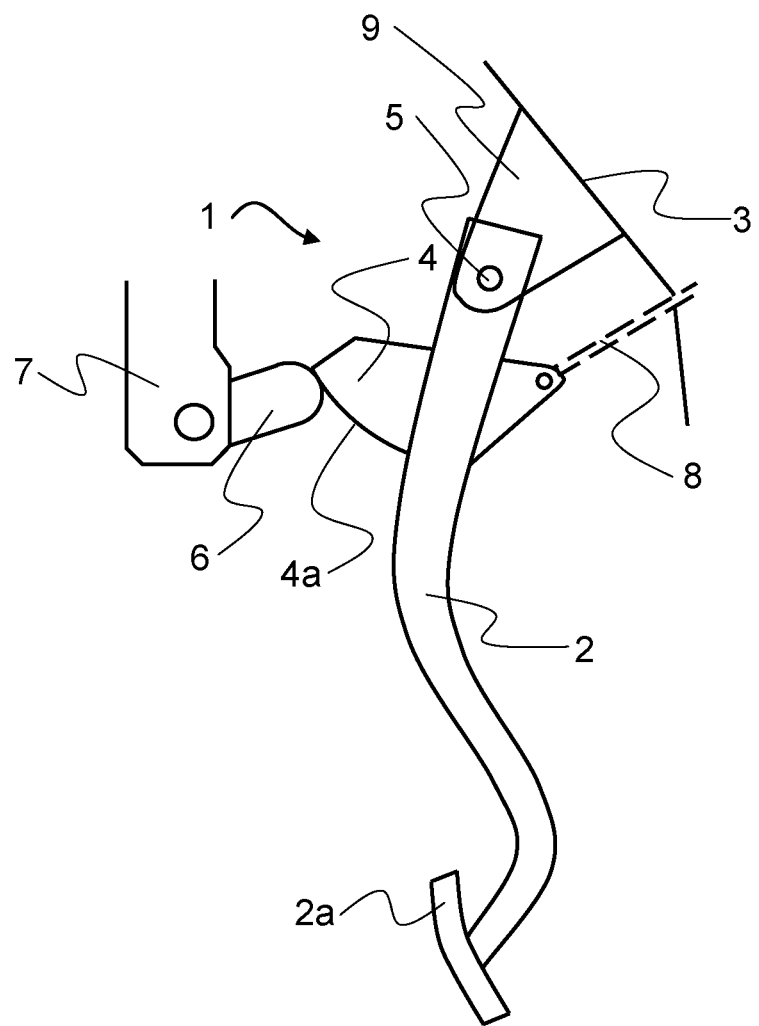
FIG. 2 is an illustration of a vehicle brake pedal crash safety device according to the inventive subject matter in a second pedal arm position.

FIG. 2 illustrates the vehicle brake pedal crash safety device 1 in accordance with the first embodiment of the present invention in a second pedal arm 2 position, where the brake pedal arm 2 has been rotated a braking position.

Figure 3:
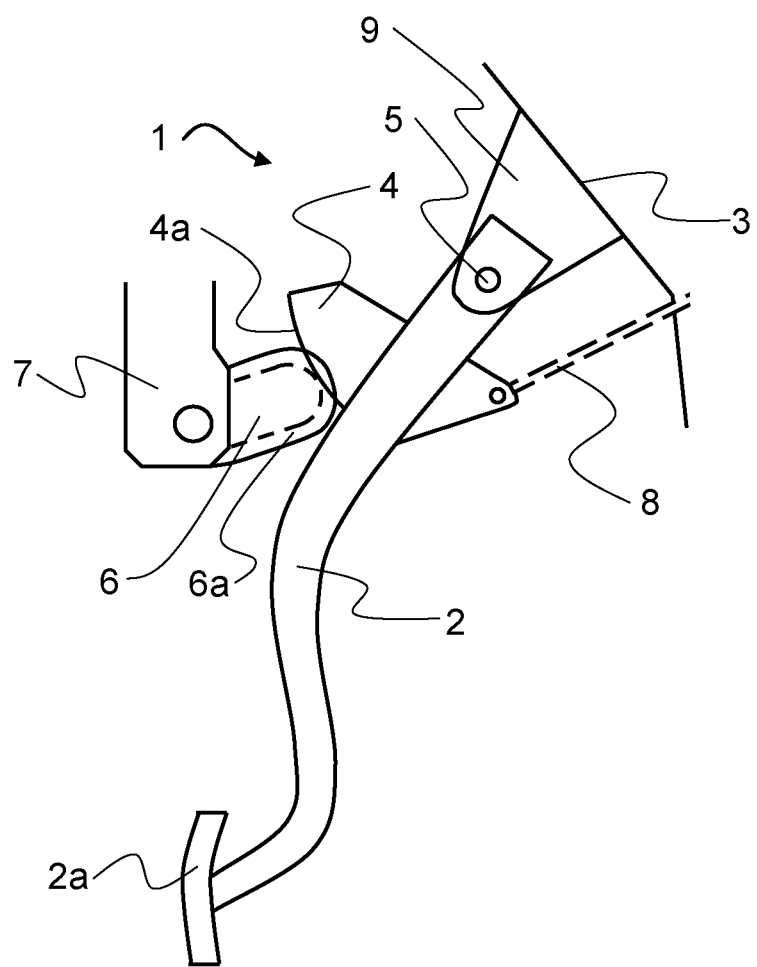
FIG. 3 is an illustration of a vehicle brake pedal crash safety device in accordance with a second embodiment of the inventive subject matter in a first pedal arm position.

In a further embodiment, as illustrated by FIG. 3, is shown a vehicle brake pedal crash safety device 1 where the second locking element 6 is U-shaped 6a, with the opening of the U towards the first locking element 4, such that, when mounted, the circular arc 4a of the first locking element 4 is located inside the U-shape 6a of the second locking element 6. The lateral distance, i.e. lateral distance in respect to an associated vehicle, between the first locking element 4 and the second locking element 6 is constant and provides a predetermined amount of play therebetween for any pedal position, such that if the first locking element 4 is moved laterally during a crash due to twisting of the brake pedal arm 2, the play in the lateral direction between the first locking element 4 and second locking element 6 is closed irrespective of the current pedal position, thus preventing the brake pedal arm 2 from twisting further through interlocking the first and second locking elements 4, 6.

When the vehicle brake pedal crash safety device 1 is mounted to an associated vehicle, a pushrod 8 is arranged between the brake pedal arm 2 and a brake servo booster (not shown). The brake servo booster is usually an hydraulic brake servo which is mounted in the engine compartment of a motor vehicle and has an input member in the form of a pushrod 8 extending through a dash panel, firewall or front bulkhead 3 separating an engine compartment from a passenger compartment to link the brake pedal arm 2 to the brake servo booster. The pushrod 8 is designed to handle all possible pedal forces originating from a driver of an associated vehicle with a margin, and to break and collapse when the force in the pushrod 8 is increased further. Thus, it will brake and collapse under any applied crash forces once the first and second locking elements 4, 6 have been interlocked. In this condition the pushrod 8 is not able to transfer any forces of importance to the brake pedal arm 2.

For mounting of the vehicle brake pedal crash safety device 1 a pedal box 9 or pedal bracket is arranged to be bolted at a first upper fixation to the brake servo booster and at a second fixation to the vehicle body in a lower point than the fixation to the brake servo booster. This lower fixation is to be positioned in height between the booster fixation and the pedal plate 2a, such that, if an external crash force is applied to the front of the associated vehicle such that the brake servo booster gets an intrusion earlier than the lower fixation of the pedal box 9, the pedal plate 2a will collapse and sink downwards of the associated vehicle.

When the pedal box 9 is bolted to the firewall 3 and booster, there is a risk that even the pedal box 9 is twisted. This may affect the brake pedal arm 2 which may also be twisted, which would result in a slanted pedal plate 2a. If the pedal plate 2a is slanted during a crash while a foot of a driver is heavily pressed towards it, there is a risk of injuries in the ankle joint of the driver. When the first locking element 4 is moved sideways during a crash due to twisting of the pedal box 9, the small amount of play in the lateral direction between the circle sector 4 and the second locking element 6 is rapidly closed. The brake pedal arm 2 will be stopped from twisting by the crash safety device 1, as the brake pedal arm 2 is designed to take higher forces than the pedal box 9 in this direction.

With this crash feature the brake pedal 2 will move some distance towards a floor of an associated vehicle at the beginning of a crash where after the brake pedal arm 2 will be locked in position both longitudinally and laterally with respect to the associated vehicle, resulting in a non-changing angle with respect to a foot of a driver, reducing risk of injuries to the lower leg of the driver.

Thus, in the event of a frontal or offset frontal collision in which the front bulkhead 3 is pushed back, the pedal box 9 is also moved rearward allowing the first locking element 4 to contact the second locking element 6 at the second vehicle body component 7, e.g. the cross-car beam. The interaction between the second locking element 6 at the cross-car beam 7 and the first locking element 4 will, if the pedal box 9 has been moved back a sufficient distance, prevent the brake pedal 2 from being pressed rearwards of the associated vehicle at the level of the second locking element 6.

In accordance with the present invention is also envisaged an automotive vehicle, which comprises a vehicle brake pedal crash safety device as described above.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A brake pedal crash safety device for a vehicle comprising:
    a first vehicle body component:
    a brake pedal arm rotatably mounted to the first vehicle body component about a pivot point, the brake pedal arm having a first locking element having a circular arc;
    a second vehicle body component;
    a second locking element mounted to the second vehicle body component and mounted a predetermined distance from the first locking element such that a constant distance between the circular arc of the first locking element and the second locking element is maintained for any brake pedal position other than during a crash, and the constant distance allows for movement therebetween for adjusting a brake pedal arm position: and
    an external crash force applied to a front of the vehicle displaces the first vehicle body component toward the second vehicle body component and the predetermined distance between the first and second locking elements will be reduced irrespective of a current pedal position, thereby preventing further rotation of the brake pedal arm about the pivot point through interlocking of the first and second locking elements.

2. The brake pedal crash safety device as claimed in claim 1 wherein;
    the first vehicle body component is a front bulkhead; and
    the second vehicle body component is a cross-bar beam.

3. The brake pedal crash safety device as claimed in claim 1 wherein the circular arc of the first locking element has a plurality of teeth on a surface.

4. The brake pedal crash safety device as claimed in claim 1 wherein the second locking element has a plurality of teeth on a surface.

5. The brake pedal crash safety device as claimed in claim 1 wherein the circular arc of the first locking element has a plurality of teeth on a surface, the second locking element has a plurality of teeth on a surface and wherein the plurality of teeth on the surfaces of the circular arc and the second locking element are arranged to mesh together and thereby interlock the first and second locking elements when the predetermined distance between the first and second locking elements is reduced.

6. The brake pedal crash safety device as claimed in claim 1 further comprising:
    the second locking element being U-shaped towards the first locking element, such that when mounted, the circular arc of the first locking element is located inside the U shape of the second locking element;
    a lateral distance between the first and second locking elements is constant and provides a predetermined amount of allowable movement therebetween for any pedal position; and
    when the first locking element is moved laterally during a crash due to twisting of the brake pedal arm, the predetermined amount of allowable movement in a lateral direction between the first and second locking elements will he closed irrespective of a current pedal position, thereby preventing the brake pedal arm from twisting further through interlocking the first and second locking elements.

7. The brake pedal crash safety device as claimed in claim 1 further comprising:
    a pushrod arranged between the brake pedal arm and the first vehicle body component; and
    the pushrod is designed to handle, within a predetermined margin, pedal forces originating from a driver of the associated vehicle and wherein the pushrod will break and collapse if the pushrod is increased further than the predetermined margin.

8. The brake pedal crash safety device as claimed in claim 7 further comprising:
    a pedal plate; and
    a pedal box having a first upper fixation to the vehicle body and a second fixation to the vehicle body;
    the second fixation is at a point lower than the first upper fixation and the second fixation is between the vehicle body and the pedal plate such that when an external crash force is applied to the front of the vehicle causing the first upper fixation of the pedal box to intrude the vehicle interior earlier than the second fixation of the pedal box, the pedal plate will collapse and sink downwards of the vehicle.

9. A brake pedal crash safety device for an automotive vehicle composing:

a first vehicle body component;

a brake pedal arm rotatably mounted to the first vehicle body component about a pivot point, the brake pedal arm having a first locking element;

a second vehicle body component;

a second locking element mounted to the second vehicle body component and mounted a predetermined distance from the first locking element such that a consant distance between a circular arc of the first locking element and the second locking element is maintained for any brake pedal position other than during a crash, and the constant distance allows for adjusting a brake pedal arm position; and an external crash force applied to a front of the vehicle displaces the first vehicle body component toward the second vehicle body component and the predetermined distance between the first and second locking elements will he reduced irrespective of a current pedal position, thereby preventing further rotation of the brake pedal arm about the pivot point through interlocking of the first and second locking elements.

10. The brake pedal crash safety device as claimed in claim 9 wherein:

the first vehicle body component is a front bulkhead; and
the second vehicle body component is a cross-bar beam.

11. The brake pedal crash safety device as claimed in claim 9 wherein the circular arc of the first locking element has a plurality of teeth on a surface.

12. The brake pedal crash safety device as claimed in claim 9 wherein the second locking element has a plurality of teeth on a surface.

13. The brake pedal crash safety device as claimed in claim 9 wherein the circular arc of the first locking element has a plurality of teeth on a surface and the second locking element has a plurality of teeth on a surface and wherein the plurality of teeth on the surfaces of the circular arc and the second locking element are arranged to mesh together and thereby interlock the first and second locking elements when the predetermined distance between the first and second locking elements is reduced.

14. The brake pedal crash safety device as claimed in claim 9 further comprising:

the second locking element is U-shaped towards the first locking element, such that when mounted, the circular arc of the first locking element is located inside the U-shape of the second locking element;

a lateral distance between the first and second locking elements is constant and provides a predetermined amount of allowable movement therebetween for any pedal position; and when the first locking element is moved laterally during a crash due to twisting of the brake pedal arm, the predetermined amount of allowable movement in a lateral direction between the first and second locking elements will be closed irrespective of a current pedal position, thereby preventing the brake pedal arm from twisting further through interlocking the first and second locking elements.

15. The brake pedal crash safety device as claimed in claim 9 further comprising:

a pushrod arranged between the brake pedal arm and the vehicle body; and the pushrod is designed to handle, within a predetermined margin, pedal forces originating from a driver of the associated vehicle and wherein the pushrod will break and collapse if the pushrod is increased further than the predetermined margin.

16. The brake pedal crash safety device as claimed in claim 15 further comprising:

a pedal plate; and a pedal box having a first upper fixation to the vehicle body and a second fixation to the vehicle body;

the second fixation is at a point lower than the first upper fixation and the second fixation is at a height between the vehicle body and the pedal plate such that when an external crash force is applied to the front of the vehicle causing the first upper fixation of the pedal box to intrude the vehicle interior earlier than the second fixation of the pedal box, the pedal plate will collapse and sink downwards of the vehicle.

\* \* \* \* \*